(12) United States Patent
Bachmeier (10) Patent No.: US 11,505,140 B2
(45) Date of Patent: Nov. 22, 2022

(54) METHOD AND DEVICE FOR ACTUATING TWO RELAYS ARRANGED IN SERIES

(71) Applicant: LISA DRAEXLMAIER GMBH, Vilsbiburg (DE)

(72) Inventor: Anton Bachmeier, Kumhausen (DE)

(73) Assignee: Lisa Draexlmaier GmbH, Vilsbiburg (DE)

( * ) Notice: Subject to any disclaimer, the term of this patent is extended or adjusted under 35 U.S.C. 154(b) by 759 days.

(21) Appl. No.: 16/534,331

(22) Filed: Aug. 7, 2019

(65) Prior Publication Data

US 2019/0359153 A1    Nov. 28, 2019

Related U.S. Application Data

(63) Continuation of application No. PCT/DE2018/100118, filed on Feb. 12, 2018.

(51) Int. Cl.
*B60R 16/023* (2006.01)
*G07C 5/02* (2006.01)
*B60L 3/00* (2019.01)

(52) U.S. Cl.
CPC ........ *B60R 16/0231* (2013.01); *B60L 3/0023* (2013.01); *B60L 3/0092* (2013.01); *G07C 5/02* (2013.01)

(58) Field of Classification Search
CPC .. B60R 16/0231; B60L 3/0023; B60L 3/0092; B60L 15/12; G07C 5/02; H02P 1/10; H02P 7/20
See application file for complete search history.

(56) References Cited

U.S. PATENT DOCUMENTS

| | | | |
|---|---|---|---|
| 6,870,723 B1 | 3/2005 | Kramer | |
| 2016/0225563 A1 | 8/2016 | Fukumoto et al. | |
| 2016/0293368 A1* | 10/2016 | Tanaka | H01H 50/40 |
| 2018/0178738 A1 | 6/2018 | Scholl et al. | |

FOREIGN PATENT DOCUMENTS

| | | | | |
|---|---|---|---|---|
| CN | 102689670 | | 9/2012 | |
| CN | 204167438 U | * | 2/2015 | |
| DE | 112014000072 T5 | * | 9/2015 | ............. E02F 3/308 |
| DE | 102015006206 | | 12/2015 | |
| JP | 2015023762 | | 2/2015 | |
| WO | WO-2014030914 A1 | * | 2/2014 | ............ B60L 3/0046 |

OTHER PUBLICATIONS

International Search Report for International Application PCT/DE2018/100118, dated May 11, 2018.

\* cited by examiner

*Primary Examiner* — Jorge L Carrasquillo
(74) *Attorney, Agent, or Firm* — Burris Law, PLLC (57) ABSTRACT

A method for controlling two serially disposed relays that switch a load with two different safety levels depending on the driving situation in a vehicle includes querying state information that includes movement state information and/or coasting operation information of the vehicle, determining a safety level of the two different safety levels depending on the driving situation, using the state information, detecting a relay of the two serially disposed relays using a balancing rule when the safety level determined in step b) represents a lower safety level of the two safety levels, switching the selected relay into a non-conductive state and keeping the further relay in a conductive state when a first request signal for switching off the load is received, and switching the selected relay into a conductive state when a second request signal for switching on the load is received.

10 Claims, 4 Drawing Sheets

METHOD AND DEVICE FOR ACTUATING TWO RELAYS ARRANGED IN SERIES

CROSS-REFERENCE TO RELATED APPLICATIONS

This application is a continuation of International Application No. PCT/DE2018/100118, filed on Feb. 12, 2018, which claims priority to and the benefit of DE 10 2017 102 937.0, filed on Feb. 14, 2017. The disclosures of the above applications are incorporated herein by reference.

FIELD

The present disclosure relates to a method for controlling two serially disposed relays that switch a load with two different safety levels in a vehicle depending on the driving situation, as well as a corresponding device for controlling two serially disposed relays that switch a load with two different safety levels in a vehicle depending on the driving situation.

BACKGROUND

The statements in this section merely provide background information related to the present disclosure and may not constitute prior art.

The possibility of malfunctions increases with the constantly growing complexity of electronic components in vehicles. If a safety-relevant component is affected by such a malfunction, this can lead in the worst case to an injury to a person. Thus, ever more safety-critical loads are controlled in motor vehicles. It is to be distinguished here between such loads whose safe state is "off," such as, for example, the motor or the starter, and such loads wherein the safe state is "on," such as, for example, an electrically controlled steering system or other functions of autonomous driving. Furthermore, loads without a particular safety classification are also present in the vehicle, which, however, are not considered further here. Here in the automotive field a classification according to ISO 26262 has been established for the loads and the control system. One aspect of adapting a control system or electrical supply to the safety requirements is the establishment of redundancy. Thus, for example, the starter of a motor is switched via two serially disposed and independently controlled relays.

A parallel trend is the necessity for increased switching cycles of the starter used. Thus, for example, a motor is started more frequently by the function of start-stop operation than was the case without this functionality. Due to further additional functions, with relay-controlled clamping the maximum switching frequency of the relays is exceeded during a vehicle service life. An example thereof is the additional coasting operation of a vehicle, which means an additional switching frequency for the relays involved. A solution approach would be an exchange of the mechanical relays by electronic relays that allow a significantly higher switching frequency. However, this means a significant redesign expense and the unit costs would also increase.

SUMMARY

The present disclosure comprises controlling two serially disposed relays according to the required safety level, i.e., if a redundant securing is required, then both serially disposed relays are always switched to be non-conductive, but when the safety level also allows a simple securing then only one of the two serially disposed relays is always switched to be non-conductive.

An inventive method for controlling two serially disposed relays is described below. The relays are configured to switch a load having two different safety levels depending on the driving situation in a vehicle. Here a safety level can be understood to mean a classification corresponding to the "Automotive Safety Integrity Level" (ASIL), i.e., (QM,) ASIL A, ASIL B, ASIL C, or ASIL D. In a first step a) of querying, state information of the vehicle is queried. The state information represents movement state information of the vehicle concerned and additionally or alternatively coasting operation information of the vehicle concerned. Movement state information can be understood to mean a speed or a speed value as well as a binary distinction between "vehicle is stationary" and "vehicle is in motion." Coasting information can be understood to mean that the vehicle is in coasting operation or has the possibility thereof. In a (motor) vehicle the term coasting or coasting operation describes a function during travel of switching off the internal combustion engine and disconnecting it from the drive train. Thus, the kinetic energy present can be advantageously used for forward movement instead of being lost in the form of drag power. The coasting is a supplementing or extension of the start-stop system, wherein the motor is only switched off when the vehicle is stationary. Thus, during coasting the switching off of the motor is already effected during rolling. In a subsequent step b) of determining, a safety level is determined. Depending on the driving situation a distinction is made between two different safety levels that are determined by evaluating the state information. Thus, either a lower safety level or a higher safety level in comparison thereto is chosen. Thus, for example, the lower safety level can be a classification according to ASIL B or QM, and the higher safety level can be a classification according to ASIL D. In a subsequent step c) of selecting, a relay of the two serially disposed relays is selected using a balancing rule. This occurs under the condition that the safety level determined in step b) represents the lower safety level of the two safety levels. When a first request single for switching off the load is received, in a subsequent step d) of switching, the selected relay is switched into a non-conducting state, wherein the not-selected, further relay remains in a conductive state. Since in a lower safety level a simple securing is sufficient, a switching cycle can thus be spared. When a second request signal for switching on the load is received, in a step e) of switching, the selected relay is switched into a conductive state, whereby both relays are switched to be conductive again and the connected load is supplied. The load represents an electrical load. Here the load can be, for example, a starter for a motor. Alternatively, in an electric vehicle the load can directly be a drive unit or its control system.

A conductive state of the relay can be understood to mean a closed relay and a non-conductive state can be understood to mean an open relay. Depending on the type of relay, the request signal is formed depending on whether it is a monostable or a bistable relay. With a monostable relay the request signal can furthermore vary depending on the stable state. Thus, depending on the type of relay the request signal can hold the signal of the state up to the next request, or it is only a relatively short switching pulse.

If the movement state information represents a speed of the vehicle above a speed threshold value, in step b) of determining, the lower safety level can be selected. Furthermore, in step b) of determining, the lower safety level can be selected if the coasting operation information represents a coasting operation of the vehicle or a possibility for a coasting operation of the vehicle. The speed threshold value can be, for example, at least 80 km/h, in particular at least 50 km/h, in particular at least 30 km/h, or in particular at least 5 km/h. Here the speed threshold value can be adapted to a road type or road situation. Here the road type or road situation can be read in from a road map or a navigation system; the road situation can be read in from a vehicle assistant or directly from an environment monitoring system. In particular, the movement state information can be adapted or can have been adapted to legal requirements. Thus, depending on the geographical location, the speed threshold value can be adapted to meet local (legal) requirements.

Furthermore, in step b) of determining, the higher safety level is selected if the movement state information represents a stoppage of the vehicle or a speed of the vehicle below a speed threshold value. In one particular form, the speed threshold value can be 0 km/h. Otherwise the speed threshold values mentioned apply. For the lower safety level, the vehicle is at least in motion. With a stationary vehicle, an unintentional actuation of the starter could lead to a starting of the motor and thereby jolt the vehicle and thus represent a safety risk. If the safety level cannot be reliably determined, the higher safety level can be chosen as standard.

In one form, the balancing rule can provide that the two serially disposed relays are alternately selected in order to thus achieve a uniform distribution of the switching cycles. Thus, a very small storage device for reading out the information about the last-selected relay is sufficient in order to provide a uniform utilization.

In one form, the balancing rule evaluates a first number of the actuated switching operations for the first relay and a second number of the actuated switching operations for the second relay. Now the relay that has been less loaded up to now can be selected for further switching operations. Here the balancing rule for a driving cycle can always switch the same relay or allow the same to be switched, and thus make possible a more efficient execution. Nevertheless, the two relays are generally loaded approximately equally over a vehicle service life.

Optionally a step f) for switching the two relays into a non-conductive state is provided when a first request signal for switching off the load is received, and if the safety level determined in step b) represents the higher safety level of the two safety levels. Thus, for example, when the vehicle is stationary, the redundant switching then desired can also be provided. Alternatively, this can also be performed by an independent or dependent method running parallel thereto If step f) of switching has been performed, it is optionally provided that in step e) of switching, both relays are switched into a conductive state when a second request signal for switching on the load is received. Thus, a switching-on of the load can also be made possible in this situation.

The inventive idea can also be implemented in a device that includes devices in order to carry out method steps of a variant of the above-described method in corresponding devices. Thus, a device for controlling two serially disposed relays, which device is configured to switch a load in a vehicle having two different safety levels depending on the driving situation, comprises the following devices:

a) a device for reading state information that comprises movement state information of the vehicle and/or coasting operation information of the vehicle;

b) a device for determining a safety level of the two safety different safety levels, which differ depending on the driving situation, using the state information;

c) a device for selecting one relay of the two serially disposed relays by using a balancing rule when the safety level determined in step b) represents a lower safety level of the two safety levels;

d) a device for switching the selected relay into a non-conductive state and the further relay into a conductive state when a first request signal for switching off the load is received; and e) a device for switching the selected relay into a conductive state when a second request signal for switching on the load is received.

The device described here can be understood as an electrical device that processes sensor signals and signals from control devices and depending thereon, outputs control signals for controlling the serially controlled relays. The device can include one or more hardware- and/or software-type interfaces. The interfaces are, for example, part of an integrated circuit wherein functions of the device are implemented, or alternatively the interfaces are, for example, self-contained integrated circuits comprising at least partially discrete components. Furthermore, the interfaces can be software modules that are present, for example, on a microcontroller in addition to other software modules.

In one form the two serially disposed relays to be switched are formed as mono-stable relays that switch into an open position without an applied switching signal. Thus, a particularly safe control system can be realized. Monostable signal relays have only one stable position, the deenergized position. Since this is the lower-energy state, the deenergized position is used as the malfunction direction in the circuit design, since it is significantly more likely that a relay is incorrectly deenergized than incorrectly energized.

In order to avoid "common cause" faults a technical form of the first relay can have technical diversity with respect to the technical implementation of the second relay. Due to the diversity of the technical form, a redundancy created by the serial arrangement is achieved inhomogeneously.

The inventive ideas proposed with reference to a method can also be implemented as a computer program product including program code that can be stored on a machine-readable carrier, such as, for example, a semiconductor storage device, a hard disk storage device, or an optical storage device, and be used for carrying out the method according to one of the above-described forms when the program product is executed on a computer or a device.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 1:
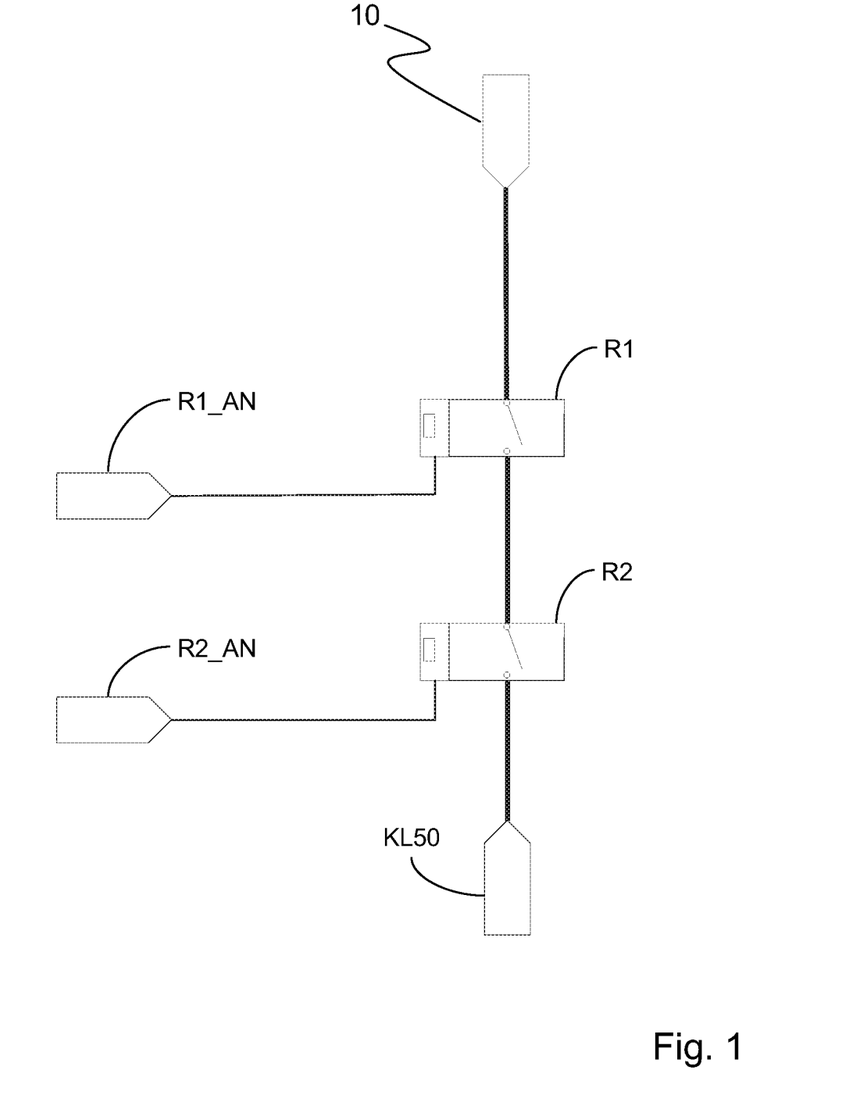
FIG. 1 is a schematic illustration of two serially disposed relays that control a load in a vehicle with two different safety levels, depending on the driving situation, according to an exemplary form of the present disclosure.

FIG. 1 is a serial arrangement of two relays R1, R2 for switching a load that is represented here by the terminal 50 KL50. The first relay R1 is controlled via a first control input R1_AN; the second relay R2 is controlled via a second control input R2_AN. Only if both serially disposed relays R1, R2 are closed, i.e., are electrically conductively switched, the supply 10 is switched to the terminal KL50.

In one exemplary form, the relays are designed to enable a switching frequency of 600,000 switching operations/switching cycles. This applies, for example, to a control system of a starter in a vehicle. Here it is the case that with a stationary vehicle an unintentional starting of the motor is to be precluded, since the vehicle could thereby jump forward and injure another road user. For this reason, two independently controlled relays are disposed in series. In a typical vehicle including an automatic start-stop system approximately 310,000 switching operations are expected during the vehicle service life. Thus, the system design is sufficient. However, if a coasting operation is now additionally provided, then the desired capability increases to 800,000 switching cycles, whereby the switching frequency of the relays used is exceeded. A solution possibility would be the use of expensive relays having an increased switching frequency. The exemplary forms depicted below show an approach for enabling the existing systems for this additional functionality. Thus, with serially connected relays that are independently controlled for safety reasons, the complete system of the relays can be loaded by an intelligent control system and the monitoring of the functional safety such that an increased start/stop capability is made possible to a certain extent.

The solution is shown based on the example of terminal KL50 depicted here in FIG. 1 but is valid for all systems having this configuration or desired safety capability. The switching cycles mentioned are only mentioned as examples and for better clarity and differ depending on the implementation and application.

As already shown, the example is based on the assumption that the safety goal is that the vehicle shall not move in an uncommanded manner, wherein the safety goal is to be used for a stationary vehicle (as a rule: motor off). In this case the safety goal means that the motor shall only start with corresponding controlling and not start due to a (hardware) fault alone. However, if the vehicle is in driving operation, it is already moving and therefore need not particularly protect the terminal KL50. Here the vehicle can be considered to be in motion starting from a speed above a threshold value. Alternatively, a control signal is received that the vehicle is in a driving situation suitable for coasting, coasting is initiated, or coasting has been initiated.

Taking into account these assumptions, the additional switching frequency of 490,000 cycles can be distributed between the two relays in a manner such that none of the relays reaches the limits of its switching frequency. Furthermore, in normal start/stop mode, 310,000 cycles of the relays are used in order not to endanger the safe state. With coasting, which only comes into consideration when the vehicle moves, one of the two relays is permanently switched on or remains permanently switched on. In order to arrive at the lowest switching load, after a switching-on of both relays only one relay is disconnected when the security goal that the vehicle shall not move in an uncommanded manner is not to be considered due to the vehicle movement. Only if the vehicle has a speed below a speed limit value or is stationary, the second relay is also opened in order to again provide the higher safety level. In other words, in the case of a moving vehicle the safety goal of "no uncommanded vehicle movement" does not apply and one of the two relays remains off and is only switched on if a start is desired during coasting.

In order to increase the yield of switching cycles from both relays, the AN cycle is constantly alternated. In one particular exemplary form, in the first driving cycle relay R1 is left (electrically conductive) and relay R2 is switched during coasting; in the next driving cycle relay R2 is left (electrically conductive) and relay R1 is switched during coasting.

A suitable method, suitable software, or a suitable device can include the switched cycles of the relays and thus improve the yield of the two relays. Thus, per driving cycle a to-be-switched relay R1 or R2 can be selected, or these are always alternately controlled or the currently less-loaded relay R1 or R2 can be selected depending on the previous load.

Optionally a diagnostic device is provided for monitoring the relays in the sense of "state of health," wherein the transition resistance and/or the contact quality or other relevant parameters are monitored in order to select the "healthier" relay. Thus, instead of the pure switching frequency the less loaded relay is determined via a relay state and the relay is correspondingly selected.

Due to the changed control system, as described here, existing relays can be capable of the desired new capabilities. Thus, a simple calculation shows that the relays with the assumptions made here of the load are configured to absorb the additional switching cycles.

Due to the present disclosure, it is possible to realize increased start cycles with existing architecture and/or existing solutions. Only the control system is adapted, for example, by the body controller. New designs can advantageously be partially avoided.

The algorithm is based on an alternating, permanent switching-on of a relay in driving operation with moving vehicle. In one exemplary form the number of driving cycles is monitored by a superordinate control unit. Also, for example, the number of switching cycles in a particular exemplary form is monitored by a superordinate control unit. Due to the monitoring a one-sided wearing of a relay with unequal driving cycles can be recognized and compensated for.

Figure 2:
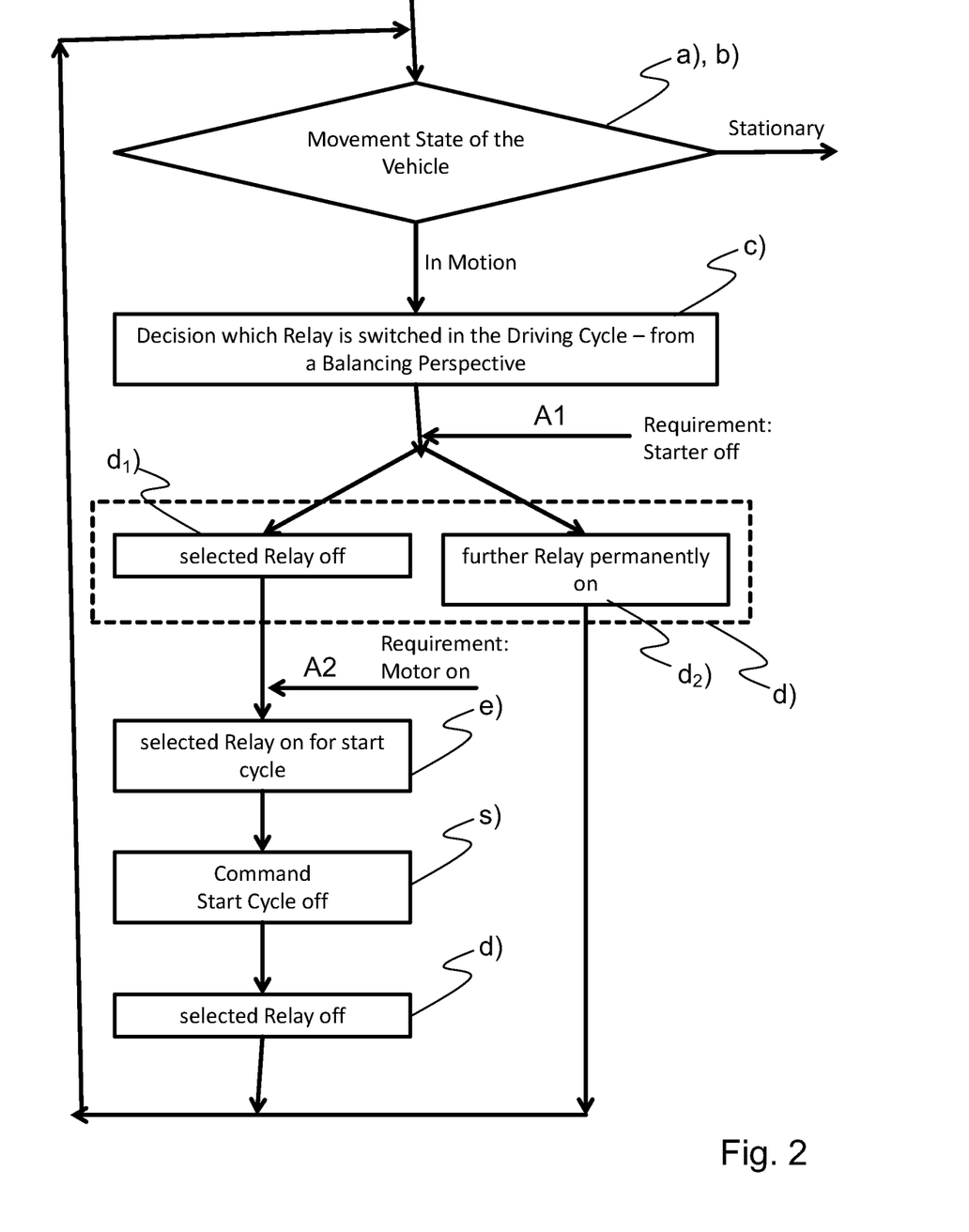
FIG. 2 is a flowchart of a method according to a first exemplary form of the present disclosure.
Figure 3:
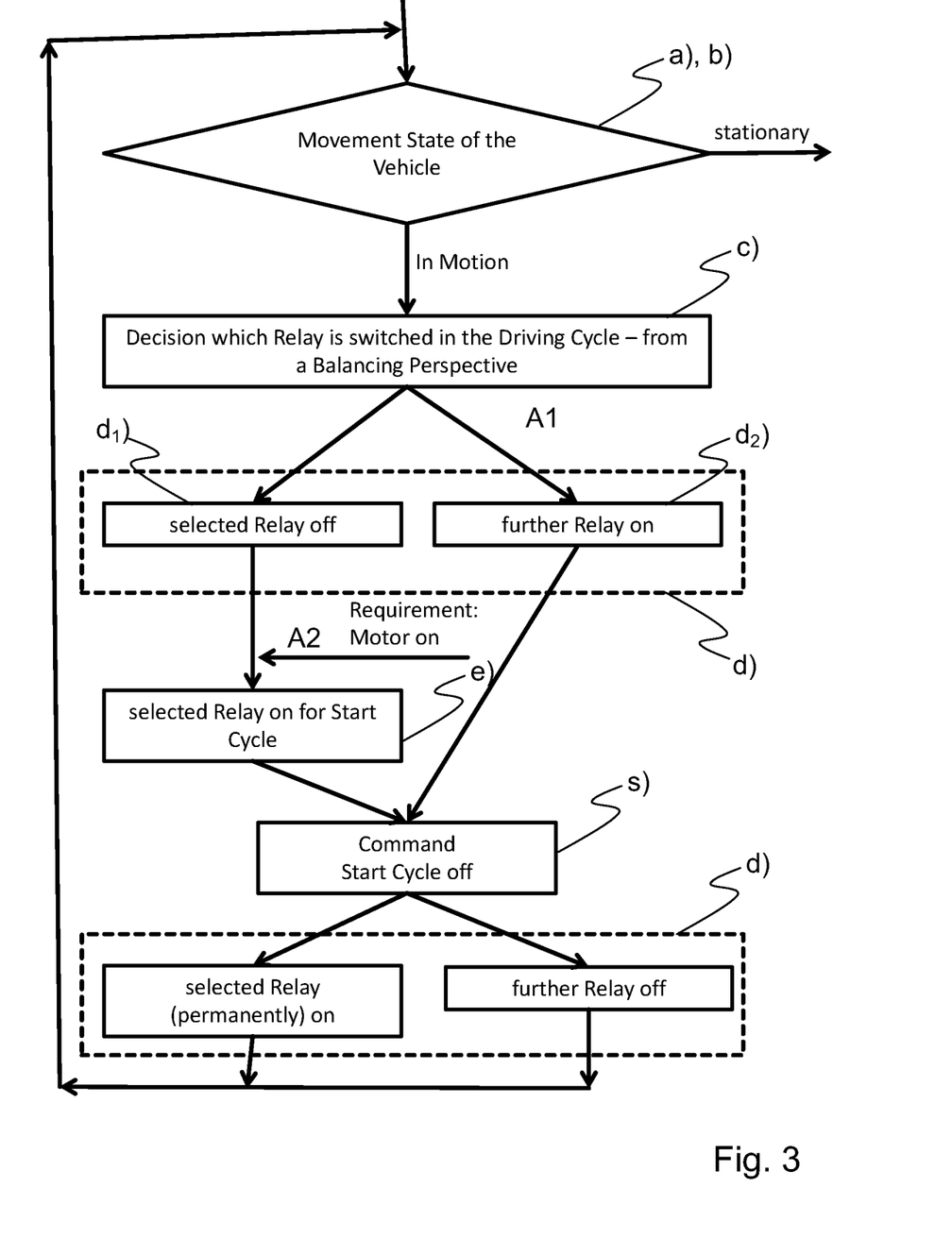
FIG. 3 is a flowchart of a method according to a second exemplary form of the present disclosure.
Figure 4:
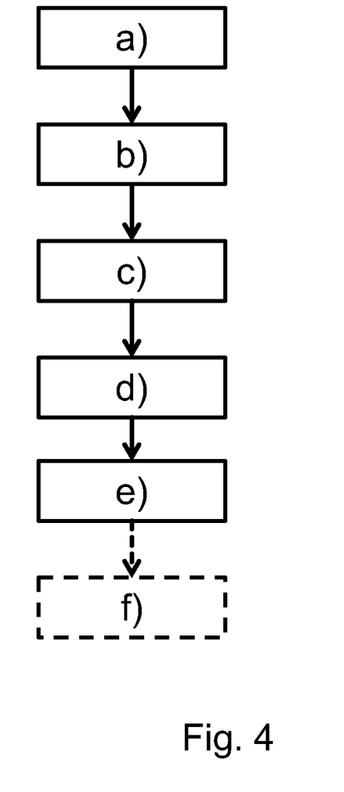
FIG. 4 is a flowchart of a method according to a third exemplary form of the present disclosure.

In the following figures, FIG. 2 to FIG. 4 are variants of the inventive method for controlling two serially disposed relays, which switch a load with two safety levels depending on the driving situation in a vehicle.

Here, FIG. 2 and FIG. 3 each show one schedule that differs in the manner of the controlling of the relays as the controlling of the relays R1, R2 changes. In the exemplary form depicted in FIG. 2, in a first step a) of the querying a state information of the vehicle is checked. The state information represents a movement state information of the vehicle and additionally or alternatively a coasting operation information of the vehicle. The step a) of querying is the basis for the following step b) of determining of the safety level, so that in FIG. 2 (and FIG. 3) these two steps are summarized. As already shown, the method is based on the differentiating between two different safety levels, wherein for the lower safety level a simple securing is desired, and for the higher safety level a redundant securing by two serially connected relays for controlling is desired. The safety levels are dependent on the state information of the vehicle. In one specific simple example the lower safety level is used with a moving vehicle and the higher safety level with a stationary vehicle. Thus, the state information is an indicator for the driving situation and the safety level can thus be determined using the state information.

With a stationary vehicle, in the exemplary form depicted in FIG. 2, the method is left in or the method remains in an endless loop in step a) or in steps a) and b) until the vehicle is in motion.

In the subsequent step c) of selecting, one of the two serially disposed relays R1, R2 is selected using a balancing rule in order to determine for the following step the relay R1 or R2 to be switched. The step c) of the selecting is performed when in step b) the lower safety level has been determined for the current driving state.

A request signal for switching the load serves as the trigger signal in order to initiate the following steps, wherein the steps d) and e) are only performed when the vehicle is in a driving state wherein the lower safety level applies. This check is performed continuously with the steps a), b) and c). Thus, the schedule depicted is a simplified illustration depending on the implementation and does not show processes of the depicted method steps running in parallel. With a software implementation, information about queues can be exchanged in order, for example, to continuously monitor the currently valid safety level in the subsequent steps and continuously provide a change into the double securing (both relays are switched off) with a change into the higher safety level. With an implementing in a device this can be provided, for example, via status lines or permanently applied status signals. However, to graphically depict this here would greatly reduce the readability.

When the vehicle is in a driving state of the lower safety level and a first request signal A1 for switching off the load is received, then in step d) of the switching the selected relay is switched into a non-conductive state and the further relay remains in a conductive state. The schedule in FIG. 2 shows a partial step d1) wherein the selected relay is set into the non-conductive state and a further partial step d2) wherein the further relay remains in the conductive state or is switched into the conductive state.

When a second request signal A2 for switching on the load is received, in a step e) of switching the selected relay switches back into a conductive state. At this point the method is started again from the beginning.

In order to show at least two variants of the proposed method, the flow diagram further includes a step s) and a further step d). Here the illustration in FIG. 3 differs. The step s) stands for a renewed command "start cycle off," whereupon in the subsequent step d) the selected relay is switched off. This stands so to speak for the step d) depicted above, wherein the further relay need not be considered, since it remains permanently switched in this driving cycle.

The command "start cycle off" is another way to describe the new receiving of a first request signal A1.

In the exemplary form according to FIG. 2, for example, during a driving cycle, the same selected relays are always switched, while the further relay remains permanently switched on. In contrast to FIG. 2, FIG. 3 shows an alternative form wherein with each switching cycle the previously switched relay remains in its switching position and the previously permanently switched-on relay is now switched in order to achieve the desired balancing effect by the alternating controlling.

FIG. 4 is a further variant of a flow plan of an inventive method for controlling two serially disposed relays, which switch a load with two safety levels depending on the driving situation in a vehicle, including the steps:

a) querying state information that comprises movement state information of the vehicle and/or a coasting operation information of the vehicle;

b) determining a safety level of the two different safety levels depending on the driving situation, using the state information;

c) selecting a relay of the two serially disposed relays using a balancing rule when the safety level determined in step b) represents a lower safety level of the two safety levels;

d) switching the selected relay into a non-conductive state and keeping the further relay in a conductive state when a first request signal for switching off the load is received; and e) switching the selected relay into a conductive state when a second request signal for switching on the load is received.

In one exemplary form the lower safety level is selected in step b) of determining when the movement state information represents a speed of the vehicle above a speed threshold value and additionally or alternatively when the coasting operation information represents a coasting operation of the vehicle or a possibility for a coasting operation of the vehicle.

In one exemplary form, in step b) of determining, the higher safety level is selected if the movement state information represents a stoppage of the vehicle or a speed of the vehicle below a speed threshold value.

In one exemplary form the balancing rule alternately selects one relay of the two serially disposed relays. In one alternative exemplary form the balancing rule evaluates a first number of the actuated switching operations for the first relay and a second number of the actuated switching operations for the second relay, and in step c) of selecting, the relay of the two serially disposed relays is correspondingly selected that has a lower number of switching processes in the comparison of the number of switching operations of the two relays to each other.

When the vehicle assumes a driving state for which the higher safety level applies, the method is usually terminated, and the controlling is assumed by a method not described in more detail here. When a first request signal A1 for switching off the load is received and when the safety level determined in step b) represents a higher safety level of the two safety levels, alternatively in an optional step f) of switching, both relays are switched into a non-conductive state. Furthermore, in step e) of switching, both relays are switched into a conductive state when a second request signal A2 for switching on the load is received and the step f) of switching has previously been performed.

Figure 5:
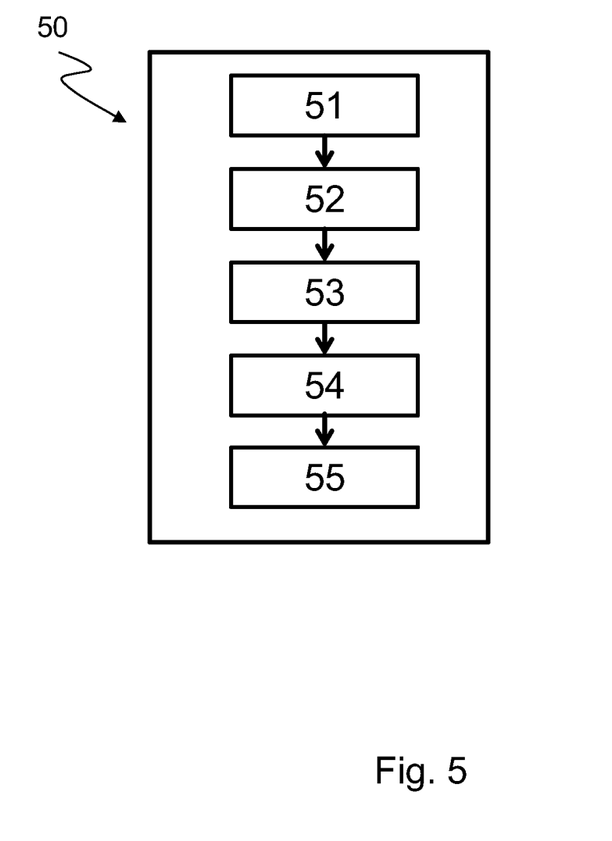
FIG. 5 is a schematic illustration of a device according to an exemplary form of the present disclosure.

FIG. 5 shows a device 50 for controlling two serially disposed relays, which is configured to switch a load with two different safety levels depending on the driving situation in a vehicle. The device 50 comprises the following devices:

a) Device 51 for querying state information that comprises movement state information of the vehicle and/or a coasting operation information of the vehicle;

b) Device 52 for determining a safety level of the two safety different safety levels, which differ depending on the driving situation, using the state information;

c) Device 53 for selecting a relay of the two serially disposed relays using a balancing rule when the safety level determined in step b) represents a lower safety level of the two safety levels;

d) Device 54 for switching the selected relay into a non-conductive state and the further relay into a conductive state when a first request signal for switching off the load is received; and e) Device 55 for switching the selected relay into a conductive state when a second request signal for switching on the load is received.

The device 50 depicted in FIG. 5 is configured to control a variant of an assembly of two serially disposed relays R1, R2 according to FIG. 1. Here in one particular exemplary form the relays are formed as monostable relays.

In order to provide the safety during the higher safety level even in exceptional situations such as, for example, extreme heat, the relays R1, R2 have diversity in their technical design.

In combination with a conventional control system of two serially disposed relays it is sufficient if the device 50 only comprises the device 52 for determining a safety level, device 53 for selecting, and device 54 for switching, since in particular the device 55 of switching would already be provided by the conventional control system. Finally, the safety level can also be provided from a separate device of a body controller (BCU) and thus be omitted here. However, the technical feasibility is only given in conjunction with the corresponding devices.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, manufacturing technology, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method for controlling two serially disposed relays that switch a load with two different safety levels depending on a driving situation in a vehicle comprising:
   a) Querying state information that comprises at least one of a movement state information of the vehicle and a coasting operation information of the vehicle;
   b) Determining a safety level of the two different safety levels depending on the driving situation, using the state information;
   c) Selecting a relay of the two serially disposed relays using a balancing rule when the safety level determined in step b) represents a lower safety level of the two safety levels;
   d) Switching the selected relay into a non-conductive state and keeping the other relay in a conductive state when a first request signal for switching off the load is received; and
   e) Switching the selected relay into a conductive state when a second request signal for switching on the load is received.

2. The method according to claim 1, wherein in step b) of determining, when the movement state information represents a speed of the vehicle above a speed threshold value and at least one of when the coasting operation information represents a coasting operation of the vehicle and a possibility for a coasting operation of the vehicle.

3. The method according to claim 1, wherein in step b) of determining, the higher safety level is selected when the movement state information represents a stoppage of the vehicle or a speed of the vehicle below a speed threshold value.

4. The method according to claim 1, wherein the balancing rule alternately selects a relay of the two serially disposed relays.

5. The method according to claim 1, wherein the balancing rule evaluates a first number of the actuated switching operations for the first relay and a second number of the actuated switching operations for the second relay and correspondingly selects the relay of the two serially disposed relays that has a lower number of switching operations in comparison with each other in the number of switching operations of the two relays.

6. The method according to claim 1 further comprising: switching the two relays into a non-conductive state when a first request signal for switching off the load is received and when the safety level determined in step b) represents a higher safety level of the two safety levels.

7. The method according to claim 1, wherein in step e) of switching, both relays are switched into a conductive state when a second request signal for switching on the load is received and the step f) of switching has been performed.

8. A device for controlling two serially disposed relays that is configured to switch a load with two different safety levels depending on the driving situation in a vehicle, including the following devices:
   a) a device for reading a state information that comprises at least one of a movement state information of the vehicle and a coasting operation information of the vehicle;
   b) a device for determining a safety level of the two safety different safety levels, which differ depending on the driving situation, using the state information;
   c) a device for selecting a relay of the two serially disposed relays using a balancing rule when the safety level determined in step b) represents a lower safety level of the two safety levels;
   d) a device for switching the selected relay into a non-conductive state and keeping the further relay in a conductive state when a first request signal for switching off the load is received; and
   e) a device for switching the selected relay into a conductive state when a second request signal for switching on the load is received.

9. The device according to claim 8, wherein the two serially disposed relays to be switched are formed as a mono-stable relays that switch into an open position without an applied switching signal.

10. The device according to claim 8, wherein the first relay has diversity with respect to the second relay in order to inhomogeneously enable a redundancy provided by the serially disposed relays.

* * * * *